3,121,743
PRODUCTION OF ACETO-ACETARYLAMIDES
Sidney John Branch, Cottingham, England, assignor to The Distillers Company Limited, Edinburgh, Scotland, a British company
No Drawing. Filed Aug. 9, 1961, Ser. No. 130,251
Claims priority, application Great Britain Aug. 23, 1960
8 Claims. (Cl. 260—562)

The present invention relates to the production of aceto-acetarylamides by the reaction of diketene with arylamines.

Acetoacetarylamides, which are intermediates in the production of valuable dyestuffs or pigments, have been produced by the addition of diketene to the arylamine under carefully controlled conditions in such a manner that the temperature of the mixture produced by this exothermic reaction does not exceed about 30° C.; the temperature may then be raised later by heating the mixture, for example to 60° C.

It has been found that, although excellent yields of the desired aceto-acetarylamides may be achieved in this way, the product may contain small quantities of by-products having a deleterious effect on the dyestuff or pigment which is eventally produced from the aceto-acetarylamide.

It is an object of the present invention to provide an improved method of producing acetoacetarylamides.

According to the present invention the process for the production of an acetoacetarylamide comprises reacting an arylamine with diketene by rapidly mixing the reactants and allowing the mixture to attain a maximum temperature in the range 50° to 80° C.

The arylamine may be an amine, such as aniline or a toluidine, which reacts readily with diketene at moderate temperatures. The process may, however, also be carried out using a less reactive arylamine, such as benzidine, diphenylamine, a nitroaniline, a chloroaniline or an alkyl ester of an aminobenzoic acid, preferably in the presence of a catalyst. Suitable catalysts are tertiary amines, or the salts of tertiary amines with weak acids such as, for example, trimethylamine, triethylamine and their acetates.

The arylamine is mixed with the diketene and the mixture is allowed to attain a maximum temperature in the range from 50° to 80° C. Conveniently the quantities of the arylamine and diketene are chosen so that they may be mixed together as rapidly as possible without producing a maximum temperature outside the range. Preferably the mixture is allowed to attain a temperature in the range from 55° to 70° C., desirably within 10 to 25 minutes from mixing. If the temperature rises too rapidly, it may be necessary to cool the reaction mixture to limit maximum temperature to a value between 50° and 80° C.; if the temperature rises too slowly, the reaction mixture may be heated externally to bring the temperature within the desired range in the desired time.

The aceto-acetarylamide produced may be recovered by crystallizing from the reaction product, washing with an inert solvent such as toluene, and drying the crystals.

The following examples further illustrate the invention. The colors of the mother-liquor after the crystallization of each batch were measured in the Lovibond tintometer using a one inch cell.

*Example 1*

3 litres of toluene and 296.5 grams of o-chloroaniline were placed in a glass reactor and stirred, the reactor being cooled by a closed coil through which cold water was passed, until the temperature of the mixture was 20° C. 1.52 grams of trimethylamine dissolved in toluene were then added, immediately followed by 199.2 grams of diketene.

The temperature of the reaction mixture rose to a maximum of 64.5° C., which was attained at 11 minutes from mixing in the diketene. After allowing the mixture to stand for one hour, the reactor contents were cooled to 20° C. and the product was crystallized, centrifuged, washed with toluene and dried. Aceto-acet-o-chloroanilide was produced as white crystals, melting point 105.5° to 106.5° C., and soluble in alkali to give a clear solution. The yield was 76.2% theoretical.

*Examples 2 to 6*

The mother-liquor and toluene washings from the run described in Example 1 were made up to 3 liters with fresh toluene and the concentration of trimethylamine was brought up to 1.52 grams. The procedure described in Example 1 was carried out (Example 2) and was then repeated in series (Examples 3 to 6).

In each run, white, crystalline aceto-acet-o-chloroanilide was obtained, and the melting point, alkali solution clarity color of the mother-liquor and yield are given in the table below, which contains the tabulated results of Examples 1 to 6.

As a comparison with the process of the invention, six comparative runs were carried out as follows, comparable to the procedure of Examples 1 to 6 above, but using the previously known technique.

296.5 grams of o-chloroaniline, 3-liters of toluene and 1.52 grams of trimethylamine were placed in the glass reactor and the temperature was raised to 30° C. 199.2 grams of diketene were added over 30 minutes, the temperature being maintained, by external cooling, to 30° to 35° C. The temperature was then maintained at 35° C. for 20 minutes and then at 60° C. for 1 hour to complete the reaction.

The reactor contents were cooled to 20° C. over 1 hour. The aceto-acet-o-chloroanilide crystals produced were recovered as in Example 1 (comparative run 1) and the series of recycles of mother-liquor and toluene washings were carried out as in Examples 2 to 6 (comparative runs

| Example | Yield of diketene (percent) | Melting point (° C.) | Color of Crystals | Alkali solution clarity | Color of mother liquor (1 inch cell) | |
|---|---|---|---|---|---|---|
| | | | | | Yellow | Red |
| 1 | 76.2 | 105.5–106.5 | White | clear solution | 0.3 | 0.1 |
| 2 | 91.0 | 105.0–106.0 | ---do--- | ---do--- | 0.3 | 0.2 |
| 3 | 95.8 | 105.0–106.0 | ---do--- | ---do--- | 0.3 | 0.1 |
| 4 | 90.6 | 105.0–106.0 | ---do--- | ---do--- | 0.4 | 0.2 |
| 5 | 97.5 | 105.0–106.0 | ---do--- | ---do--- | 0.4 | 0.4 |
| 6 | 93.2 | 105.0–106.0 | ---do--- | ---do--- | 0.5 | 0.1 |
| Comparative: | | | | | | |
| Run 1 | 72.7 | 105.5–106.0 | ---do--- | ---do--- | 0.5 | mil |
| Run 2 | 90.3 | 104.5–105.0 | ---do--- | very slightly turbid | 0.9 | 0.1 |
| Run 3 | 91.5 | 104.5–105.5 | Off-white | clear solution | 1.0 | 0.2 |
| Run 4 | 92.7 | 104.5–105.5 | very pale cream | some turbidity | 2.0 | 0.4 |
| Run 5 | 90.4 | 104.5–106.0 | ---do--- | ---do--- | 2.5 | 0.5 |
| Run 6 | 87.0 | 104.5–105.5 | pale cream | slightly turbid | 4.0 | 0.7 |

2 to 6). The color of the crystals, melting point, alkali solution clarity, color of the mother-liquor and yield are given in the lower portion of the table, for each of the comparative runs 1 to 6.

I claim:

1. In the process for the production of an aceto-acetarylamide which comprises reacting an arylamine with diketene, the improvement comprising the steps of
    (a) admixing arylamine and diketene substantially instantaneously, and
    (b) maintaining the temperature of the resultant admixture between 50° and 80° C.

2. The process as claimed in claim 1 in which the arylamine is a primary aromatic amine.

3. The process as claimed in claim 1 in which the arylamine is a secondary aromatic amine.

4. The process as claimed in claim 1 in which the arylamine is selected from the group consisting of halogen-substituted and nitro-substituted primary and secondary aromatic amines, amino carboxylic acids and esters of amino-carboxylic acids.

5. The process as claimed in claim 1 in which the arylamine is o-chloroaniline.

6. The process as claimed in claim 1 in which the reaction is carried out in the presence of a catalyst selected from the group consisting of a salt of a tertiary aliphatic amine with a weak acid.

7. The process as claimed in claim 1 in which the mixture of reactants is allowed to attain a maximum temperature in the range 55° to 70° C. within 10 to 25 minutes from the time of mixing.

8. The process as claimed in claim 1 in which the aceto-acetarylamide is recovered by recrystallization from the reaction product.

References Cited in the file of this patent

UNITED STATES PATENTS

| | | |
|---|---|---|
| 1,982,675 | Law | Dec. 4, 1934 |
| 2,174,239 | Gleason | Sept. 26, 1939 |
| 2,714,117 | Lacey et al. | July 26, 1955 |